Figure 1:
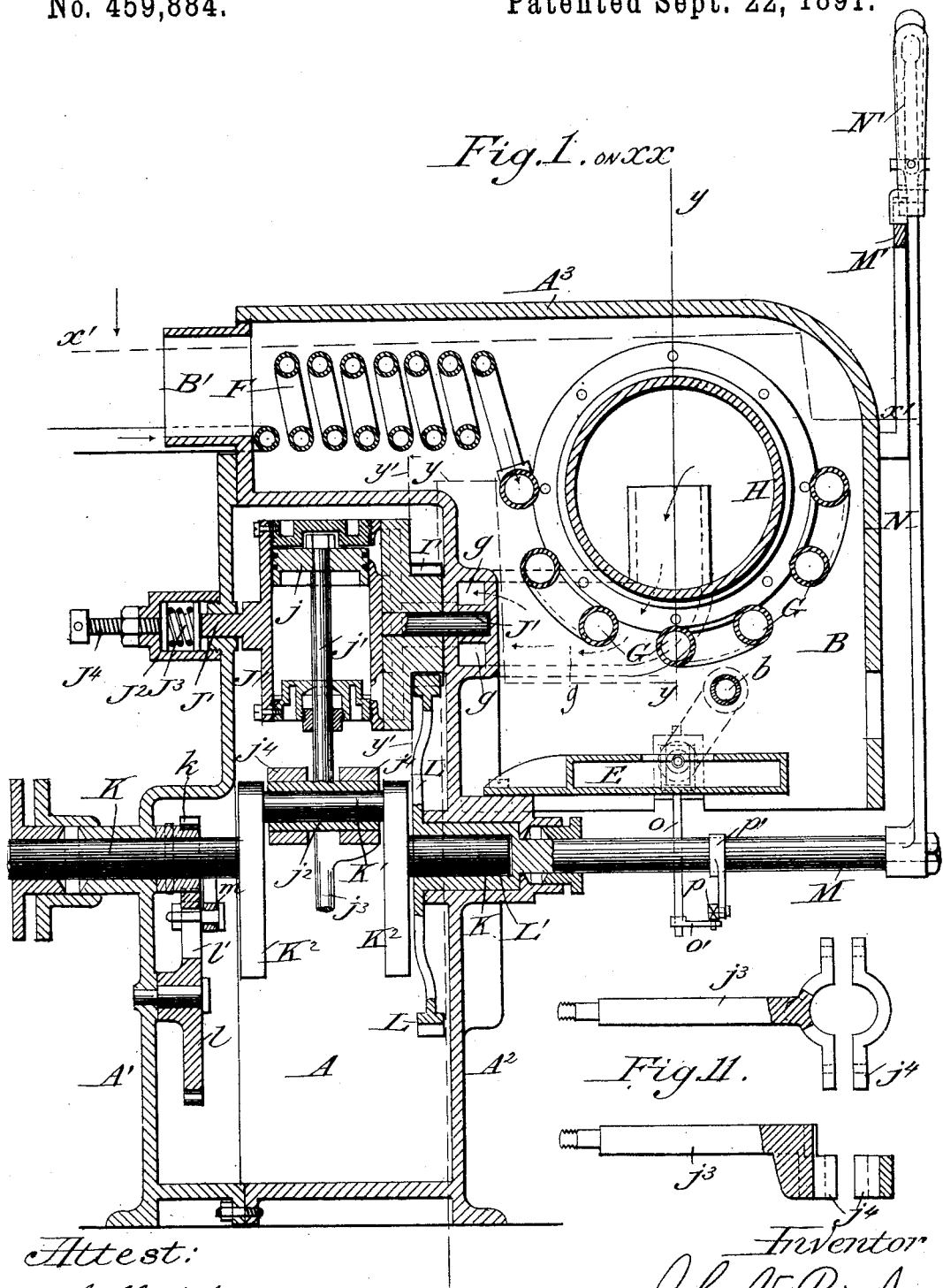

(No Model.) 4 Sheets—Sheet 1.

J. V. RICE, Jr.
ENGINE.

No. 459,884. Patented Sept. 22, 1891.

Attest:
F. H. Schott
Wm. L. Boyden

Inventor
John V. Rice Jr.
per Fred E. Tasker
Atty.

(No Model.) 4 Sheets—Sheet 2.

J. V. RICE, Jr.
ENGINE.

No. 459,884. Patented Sept. 22, 1891.

Fig. 2. on yy.

Attest:
F. H. Schott
Com L. Boyden

Inventor
John V. Rice Jr.
per Fred E. Tasker
Atty (No Model.) 4 Sheets—Sheet 3.

J. V. RICE, Jr.
ENGINE.

No. 459,884. Patented Sept. 22, 1891.

Attest
F. H. Schott
Wm. L. Boyden

Inventor
John V. Rice Jr.
per H. E. Tasker
Atty (No Model.)

J. V. RICE, Jr.
ENGINE.

No. 459,884. Patented Sept. 22, 1891.

4 Sheets—Sheet 4.

Attest:
F. H. Schott
Ann L. Boyden

Inventor:
John V. Rice Jr.
per Fred E. Tasker
Atty

UNITED STATES PATENT OFFICE.

JOHN V. RICE, JR., OF CHESTER, PENNSYLVANIA; SAID RICE, JR., AND JOHN V. RICE, SR., GUARDIAN OF SAID JOHN V. RICE, JR., ASSIGNORS OF ONE-HALF TO JAMES A. TAYLOR, OF WILMINGTON, DELAWARE.

ENGINE.

SPECIFICATION forming part of Letters Patent No. 459,884, dated September 22, 1891.

Application filed May 3, 1890. Serial No. 350,506. (No model.)

*To all whom it may concern:*

Be it known that I, JOHN V. RICE, Jr., a citizen of the United States, residing at Chester, in the county of Delaware and State of Pennsylvania, have invented certain new and useful Improvements in Engines; and I do hereby declare the following to be a full, clear, and exact description of the invention, such as will enable others skilled in the art to which it appertains to make and use the same.

My invention relates to an improvement in engines, and more especially to that particular type of engine known as an "oscillating-cylinder engine," my form being that of a triple-cylinder pattern, whereby the effect of the dead-point of the stroke is avoided. Any desired kind of motive power may be employed to actuate the engine—such, for instance, as steam, compressed air, gas, or other power.

In the present example of the invention I prefer to make use of a liquefiable gas or vapor—such as naphtha, sulphide of carbon, or gasoline—which is used expansively, it being used over and over again indefinitely in a cycle of automatic operations and the vaporization being effected by the application of heat derived from the combustion of a portion of the said liquefiable gas or vapor. I am not restricted, however, to the use of this gas, but simply give it here as an example of one of the numerous means that may be employed.

The objects of the invention are to provide a high-speed engine having as few parts as possible and therefore small in structure, but developing an increased amount of power in proportion to the size of the engine and the amount of space occupied as compared with other engines of the same class, to arrange the cylinders so as to avoid the dead-point of the stroke, this point being overcome by using three oscillating cylinders arranged at an angle of one hundred and twenty degrees to each other; to locate the parts of the engine conveniently for easy and successful manipulation; to facilitate the control of the valve for regulating the forward or reverse motion or for stopping the engine, so as to adapt it particularly well for use in running the propeller of a launch, boat, or other vessel, or for driving street-cars or other machinery; and my invention consists, essentially, in the construction, arrangement, and combination of parts, substantially as will be hereinafter fully described, and then particularly pointed out in the ensuing clauses of the claim.

Figure 2:
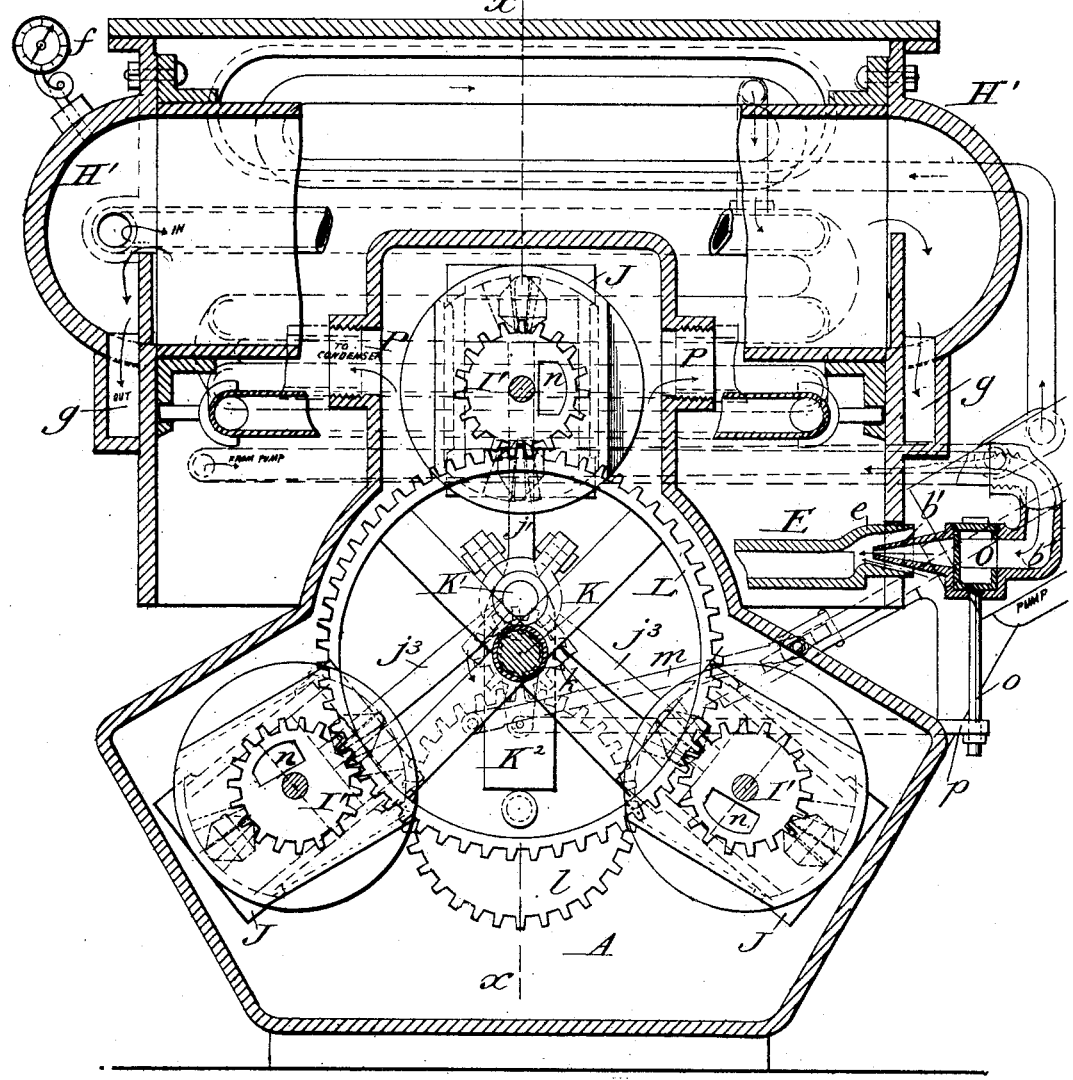
Figure 3:
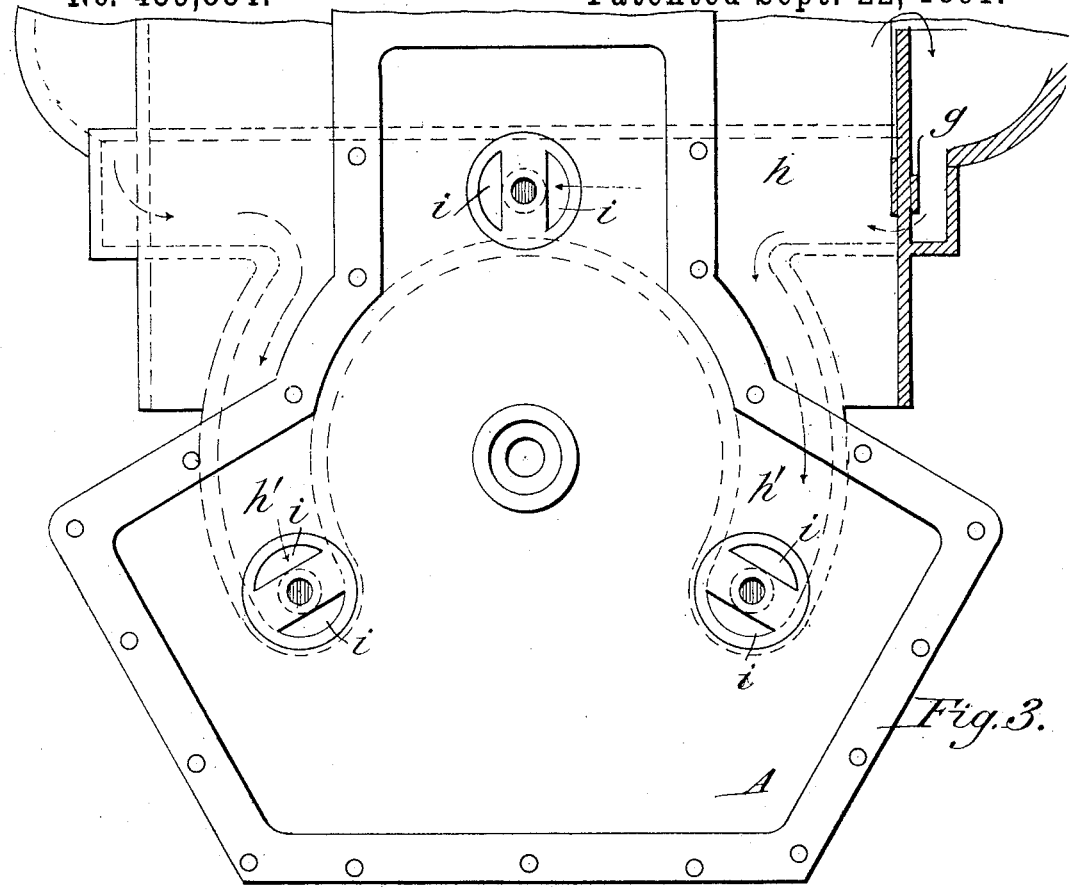
Figure 5:
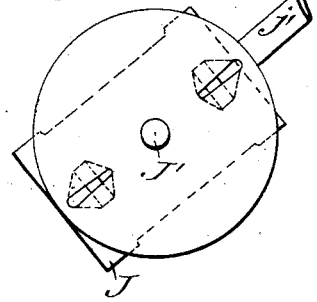
Figure 4:
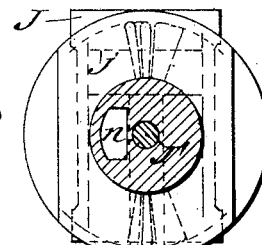
Figure 6:
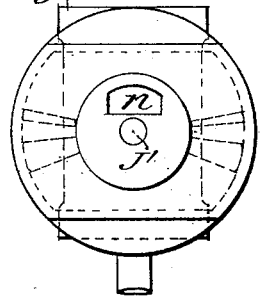
Figure 7:
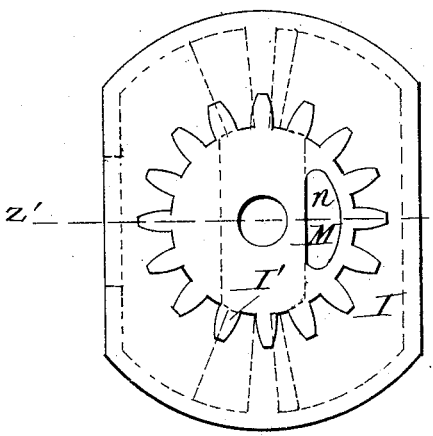
Figure 8:
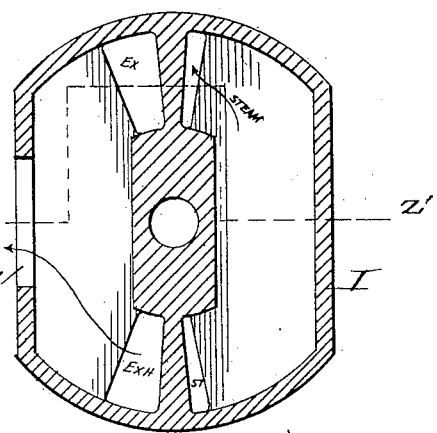
Figures 9, 10:
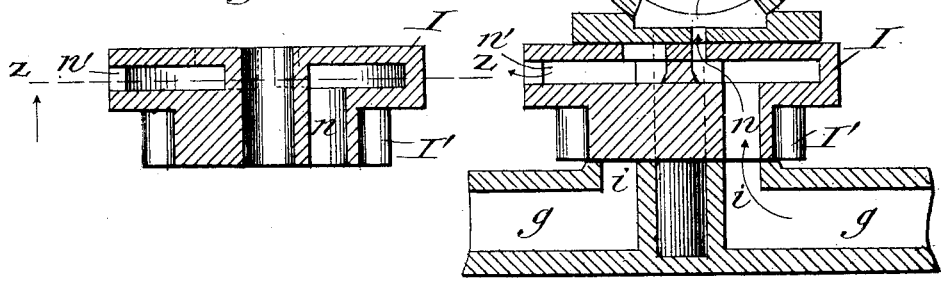

In the annexed drawings, illustrating my invention, Figure 1 is a vertical section of my improved engine on the line $x\ x$ of Fig. 2. Fig. 2 is a vertical section of the same on the line $y\ y$ of Fig. 1, the section being taken at right angles to the section of Fig. 1. Fig. 3 is a detail side elevation of the chamber wherein the cylinders are located and certain of the contiguous parts. Fig. 4 is a detail side elevation of the three cylinders and their valves, taken on the line $y'\ y'$ of Fig. 1. Figs. 5 and 6 are detail views of the cylinder, showing different positions of their valves. Figs. 7, 8, 9, and 10 are detail views showing the construction of the cylinder-valves, Fig. 8 being a section on the line $z\ z$ of Fig. 9, while Figs. 9 and 10 are sections, respectively, of Figs. 7 and 8 on the line $z'\ z'$, other parts being also shown in Fig. 10. Fig. 11 is a detail view showing the construction of the piston-rods.

Similar letters of reference designate corresponding parts throughout all the different figures of the drawings.

The main frame of the engine, in connection with which the several mechanical parts are arranged, may have any suitable and desirable construction to adapt it for its purpose. I preferably make it of the upright castings $A'$ and $A^2$, securely bolted together, as shown, between which is the exhaust-chamber A, wherein are located the triple cylinders, and also of the longitudinal upper casting $A^3$, between which and casting $A^2$ is the chamber B, having the smoke-outlet B', and used for certain purposes when liquefiable gas is employed as the motor.

J J J denote the three oscillating cylinders of my improved engine. They are provided with the gudgeons or trunnions $J'\ J'$, located near the middle of their length, on which they rock, swaying to and fro through the small arc, so as to enable their piston-rods to follow the movements of the crank to which they are directly attached without the intervention of a connecting-rod. The horizontal trunnions J' J' have suitable journal-bearings in the castings A' and A² of the main frame. (See Fig. 1.) External to the outer trunnion a box J² is fastened on the frame by being screwed upon the screw-threaded flange on the frame or by some other suitable attaching means, within which box is coiled a spring J³, which bears upon the end of the trunnion, the tension of this spring being regulated by set-screws J⁴, that press on the spring, and proper plates or washers being preferably interposed between the set-screws and spring and the spring and trunnion, as shown in Fig. 1. By adjusting the set-screws the spring may be made to bear with greater or less pressure upon the trunnion. Thus a perfectly tight joint is in this way maintained between the cylinders and their reversing-valve seats. By means of this construction, also, a safety-valve or safety appliance is provided, because when the pressure in the contiguous chamber becomes too great these cylinders will be shifted laterally by the sliding of the trunnions, resulting in a compression of the springs, and this movement of the cylinders will permit the gas, steam, air, or other motive means to escape into the exhaust-chamber A until the outer pressure is reduced sufficiently to allow the springs to restore the cylinders to their former and normal position. In this way a safe pressure may be maintained at all times in the engine.

The construction of the cylinders need not be particularized here, as they may be made in any proper manner to operate successfully as oscillating cylinders.

$j$ denotes the piston, and $j'$ the piston-rod, of the upper cylinder. The upper piston-rod $j'$ is furnished at its lower end with a sleeve $j^2$, preferably made in two parts, which encircles the crank-shaft. The piston-rods $j^3$ $j^3$, belonging to the pistons in the two lower cylinders, are constructed in the manner shown in detail in Fig. 11, being provided with sectional clamps $j^4$, which are offset from the main direction of the piston-rods, as shown, enough to enable them to be secured around the sleeve $j^2$, the clamp of one piston-rod $j^3$ being located on one side of rod $j'$ and the clamp of the other rod $j^3$ being on the other side of rod $j'$, (see Fig. 1,) and in this way all three piston-rods are so connected to the crank-shaft as to lie in the same vertical plane with each other. The three cylinders are located at angles of one hundred and twenty degrees to each other. The dead-point in the stroke is effectually overcome by this arrangement. No matter when or where the pistons stop, some one of them will be located so as to begin work readily when the engine starts anew.

K designates the main engine-shaft. It runs horizontally through the chamber A. One end is supported in a bearing in the casting A'. The other end is received into the sleeve-like hub L' of the main reversing-gear L, said hub L' having a suitable bearing in the frame A², wherein it turns like a journal, as I shall presently proceed to describe. The main shaft K has the crank K', to which the piston-rods are connected, as we have seen, without the intervention of a connecting-rod. The main shaft has also in connection with its crank the heavy parallel arms K² K², which revolve with the shaft and serve the same purpose and function as a balance-wheel.

On the main shaft K, close to its bearing in casting A', is fixed a pinion $k$, which meshes with a gear-wheel $l$, turning on a stud or pin projecting from the frame-casting A'. The gear-wheel $l$ is slotted at $l'$ to contain an adjustable pin on the connecting-rod $m$, (see Figs. 1 and 2,) which connects with a plunger-rod of a pump, which may be and is sometimes employed, especially when a liquefiable gas is employed as the motor, said pump having for its purpose that of delivering naphtha to the engine. It will be obvious from this description how the pump is driven which delivers naphtha to the engine. The adjustable pin just mentioned enables the engineer to regulate the throw of the pump, and thus determine the amount of naphtha which it may be desired to deliver to the retort or burner.

Each reversing-valve I is provided with a pin I', formed thereon, (see Figs. 2, 9, and 10,) which is slotted at $n$ to provide a port or opening adapted to communicate with one or the other of the ports $i$, according to the position of the reversing-valve. The three pinions I' I' I' are severally engaged by the main reversing-wheel L, whose hub L', as we have seen, has a bearing in the casting A², said hub being formed integral with the horizontal shaft M, which has a bearing adjacent to the hub L', and the outer end of the shaft M is fixed, the reversing-rod N (see Fig. 1) having handle N' and located alongside of the quadrant M'. (See Fig. 1.) The engineer by laying hold of the handle can turn the valve-seats each a half-revolution, thereby placing the exhaust-ports where the heavy ports formerly were, or vice versa, according as he may desire, thus reversing the engine.

In the present example of my invention, inasmuch as I have preferred to employ a liquefiable gas for the purpose of actuating the engine, I have illustrated in the drawings certain parts of a naphtha-retort and its connections therein, whereby the gas is heated, liquefied, circulated, and fed to the engine for the purpose of operating the same, said parts being shown in this case simply for the purpose of illustration, it not being my intention to claim the same herein, inasmuch as they are made the subject of a separate application for Letters Patent, filed June 24, 1891, Serial No. 397,360.

Proceeding to a very brief and hasty description of certain of the parts of the retort, it will be only necessary to state that B is the combustion-chamber, within which is a horizontal pipe-coil F and another coil G, the latter coil partially surrounding the pressure-chamber H, and horizontally in the bottom of the combustion-chamber B is located a burner E.

O denotes a valve (see Fig. 2) in the pipe $b$ at a point near the nozzle $b'$, (having enlarged portion $e$,) which enters the burner E, said valve having the downwardly-projecting vertical arm $o'$, which is pivotally connected with the rod $p$, which is in turn pivoted to a crank $p'$ on the shaft M, so that as the shaft rotates the valve O will also rotate and operate to regulate the supply of gas to the burner. There is also a suitable supply of the naphtha and suitable pipes and connections for carrying it to the different parts of the engine and then circulating it through the same. The pressure tube or chamber H is provided near each end with a port $g$, where the gas finds an exit from the chamber, and these ports admit the gas to conduits or passages, which convey to each of the three cylinders. Further explanation of the detailed construction of these several parts and of the operation of the gas in them is unnecessary here, as before stated. All this is included in another application for Letters Patent, and as the same is not here claimed it may be properly omitted.

The operation of the oscillating cylinders is similar to that of all cylinders of this kind. The gas, steam, air, or other motive power having been admitted to the reversing-valve passes through them into the cylinders therein, operates on the pistons automatically, as is usual in oscillating cylinders, and then exhausts through the exhaust-ports of reversing-valve into the exhaust-chamber A.

The construction of the reversing-valves is fully indicated in Figs. 7, 8, 9, and 10, and it is seen how the gas enters and is exhausted from the cylinder. The reversing-valve has the central partition, and while the gas admitted through port $m$ from port $i$ is passing from one side of the valve into the cylinder the exhaust from the cylinder is passing out through the other side of the valve and finding exit through exhaust-port $n'$ into the exhaust-chamber A. (See Fig. 8.) In Fig. 6 we see port $n$ so placed as to be between the ports $i\ i$, in which position the gas is shut off from entering the cylinder and the engine is stopped on its center. In the other figures other positions of the valve and cylinders are shown, the ports being indicated in dotted lines. (See Fig. 2 also, which indicates still further the location of ports and cylinders at different times.) The exhaust-chamber A may be provided with openings P P, (see Fig. 2,) at which points are connected pipes leading to the condenser. Through these openings, therefore, the gas with which chamber A is filled emerges and passes to the condenser, where it is liquefied, after which it is reconveyed to any suitable storage-tank. In this way the naphtha may be used over and over again.

Having thus described my invention, what I claim as new, and desire to secure by Letters Patent, is—

1. In an engine, the combination of the exhaust-chamber, the three oscillating cylinders arranged therein at angles of one hundred and twenty degrees to each other, the main engine-shaft supported in a casing of the exhaust-chamber and having a single crank, which is connected to the three piston-rods and the cylinder-valves with their reversing-pinions, together with the gear which engages said pinions, and a handle and shaft for rocking said gear, substantially as described.

2. In an engine, the combination, with the oscillating cylinders and their reversing-valves, each having a pinion thereon, of the shaft with its gear connected thereto and engaging the pinions, the exhaust-chamber containing the cylinders and valves, supporting in its casing the main shaft, together with the supply passages and ports suitably arranged for conducting the gas, steam, or other motive power for the engine, substantially as described.

3. The combination, with the oscillating cylinders and their reversing-valves, each having a pinion thereon, of the rotative shaft having a gear connected thereto which engages the several pinions, and the handle for rocking said shaft, substantially as described.

In testimony whereof I affix my signature in presence of two witnesses.

JOHN V. RICE, JR.

Witnesses:
GEO. B. LINDSAY,
J. WALTER LINDSAY.